(12) United States Patent
Blackford et al.

(10) Patent No.: US 10,189,231 B2
(45) Date of Patent: *Jan. 29, 2019

(54) FABRIC HAVING A WATERPROOF BARRIER

(71) Applicant: Columbia Sportswear North America, Inc., Portland, OR (US)

(72) Inventors: Michael E. "Woody" Blackford, Portland, OR (US); Jeffrey Thomas Mergy, Portland, OR (US); Craig M. Gates, Portland, OR (US); Wayne Alan Skankey, Portland, OR (US)

(73) Assignee: Columbia Sportswear North America, Inc., Portland, OR (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/436,532

(22) Filed: Feb. 17, 2017

(65) Prior Publication Data
US 2017/0157902 A1    Jun. 8, 2017

Related U.S. Application Data

(63) Continuation-in-part of application No. 14/852,321, filed on Sep. 11, 2015, now Pat. No. 10,086,582.
(Continued)

(51) Int. Cl.
*B32B 5/06*   (2006.01)
*B32B 27/12*  (2006.01)
(Continued)

(52) U.S. Cl.
CPC ............... *B32B 27/12* (2013.01); *B32B 3/06* (2013.01); *B32B 5/02* (2013.01); *B32B 5/06* (2013.01);
(Continued)

(58) Field of Classification Search
CPC ..... Y10T 428/197; B32B 3/10; A41D 27/245; B29C 66/41; B29C 66/435
See application file for complete search history.

(56) References Cited

U.S. PATENT DOCUMENTS

| 4,194,041 A | 3/1980 | Gore |
| 4,340,384 A | 7/1982 | Normi |

(Continued)

FOREIGN PATENT DOCUMENTS

| CN | 101228312 | 7/2008 |
| CN | 101748609 | 6/2010 |

(Continued)

OTHER PUBLICATIONS

Sierra Trading Post, Website, The Waterproof Guide, http://www.sierratradingpost.com/lpl2/waterproof-guide/, 2015.
(Continued)

*Primary Examiner* — Alexander S Thomas
(74) *Attorney, Agent, or Firm* — Schwabe, Williamson & Wyatt, P.C.

(57) ABSTRACT

Provided herein are ecologically friendly waterproof fabrics that include a base fabric having a body-facing surface and an outward-facing surface, and a hydrophobic, waterproof barrier disposed on the outward-facing surface of the base fabric. The base fabric may be a wicking fabric or may be treated with a compound that enhances wicking, and the hydrophobic, waterproof barrier may include a plastic polymer, polyurethane, polyethylene, and/or polytetrafluoroethylene. The waterproof fabrics also may include an abrasion-resistant coating and/or a PFC-free durable water repellant (DWR) agent disposed on an outward-facing surface of the hydrophobic, waterproof barrier, and one or both of the
(Continued)

abrasion-resistant coating and/or PFC-free DWR agent may be discontinuous. Also provided are methods of making a waterproof fabric.

20 Claims, 13 Drawing Sheets

Related U.S. Application Data

(60) Provisional application No. 62/049,644, filed on Sep. 12, 2014, provisional application No. 62/296,542, filed on Feb. 17, 2016.

(51) Int. Cl.

| | | |
|---|---|---|
| *B32B 27/40* | (2006.01) | |
| *B32B 27/20* | (2006.01) | |
| *B32B 27/32* | (2006.01) | |
| *B32B 37/22* | (2006.01) | |
| *B32B 37/24* | (2006.01) | |
| *B32B 5/02* | (2006.01) | |
| *B32B 7/04* | (2006.01) | |
| *B32B 27/36* | (2006.01) | |
| *B32B 3/06* | (2006.01) | |
| *B29L 31/48* | (2006.01) | |
| *A41D 27/24* | (2006.01) | |
| *A41D 31/00* | (2006.01) | |
| *B29C 65/50* | (2006.01) | |
| *B29C 65/00* | (2006.01) | |

(52) U.S. Cl.
CPC ............... *B32B 7/04* (2013.01); *B32B 27/20* (2013.01); *B32B 27/32* (2013.01); *B32B 27/322* (2013.01); *B32B 27/36* (2013.01); *B32B 27/40* (2013.01); *B32B 37/223* (2013.01); *B32B 37/24* (2013.01); *A41D 27/24* (2013.01); *A41D 31/0016* (2013.01); *A41D 31/0061* (2013.01); *A41D 2400/22* (2013.01); *B29C 65/5042* (2013.01); *B29C 66/1142* (2013.01); *B29C 66/43* (2013.01); *B29C 66/7292* (2013.01); *B29C 66/73187* (2013.01); *B29L 2031/4842* (2013.01); *B32B 2037/243* (2013.01); *B32B 2250/02* (2013.01); *B32B 2250/03* (2013.01); *B32B 2250/40* (2013.01); *B32B 2255/02* (2013.01); *B32B 2255/10* (2013.01); *B32B 2255/20* (2013.01); *B32B 2255/24* (2013.01); *B32B 2255/26* (2013.01); *B32B 2255/28* (2013.01); *B32B 2307/302* (2013.01); *B32B 2307/304* (2013.01); *B32B 2307/406* (2013.01); *B32B 2307/4026* (2013.01); *B32B 2307/41* (2013.01); *B32B 2307/54* (2013.01); *B32B 2307/554* (2013.01); *B32B 2307/558* (2013.01); *B32B 2307/584* (2013.01); *B32B 2307/724* (2013.01); *B32B 2307/728* (2013.01); *B32B 2307/7246* (2013.01); *B32B 2307/7265* (2013.01); *B32B 2307/73* (2013.01); *B32B 2307/75* (2013.01); *B32B 2323/04* (2013.01); *B32B 2327/18* (2013.01); *B32B 2367/00* (2013.01); *B32B 2375/00* (2013.01); *B32B 2437/00* (2013.01); *B32B 2437/02* (2013.01); *Y10T 428/197* (2015.01)

(56) References Cited

U.S. PATENT DOCUMENTS

| | | | |
|---|---|---|---|
| 4,344,999 A | 8/1982 | Gohike | |
| 4,483,900 A | 11/1984 | Goldfarb | |
| 4,863,788 A | 9/1989 | Bellairs et al. | |
| 5,155,867 A | 10/1992 | Norvell | |
| 5,322,729 A | 6/1994 | Heeter et al. | |
| 5,539,072 A | 7/1996 | Wu | |
| 5,814,405 A | 9/1998 | Branca | |
| 5,885,679 A | 3/1999 | Yasue et al. | |
| 5,885,738 A | 5/1999 | Hannon | |
| 6,415,449 B2* | 7/2002 | Duplock | A41D 13/012 2/275 |
| 6,521,552 B1 | 2/2003 | Honna et al. | |
| 6,541,589 B1 | 4/2003 | Bailie | |
| 6,774,065 B2 | 8/2004 | Haruta et al. | |
| 7,306,729 B2 | 12/2007 | Bacino | |
| 7,695,579 B2 | 4/2010 | Kramer et al. | |
| 7,930,767 B2* | 4/2011 | Reynolds | A41B 17/00 2/69 |
| 10,086,582 B2* | 10/2018 | Blackford | B32B 5/06 |
| 2003/0130393 A1 | 7/2003 | Cavanaugh | |
| 2003/0167755 A1 | 9/2003 | Nakatani | |
| 2005/0136762 A1 | 6/2005 | Norvell | |
| 2007/0009679 A1 | 1/2007 | Holcombe | |
| 2007/0166503 A1 | 7/2007 | Hannigan | |
| 2007/0272606 A1 | 11/2007 | Freese | |
| 2008/0127395 A1 | 6/2008 | Blauer | |
| 2001/0197331 | 8/2011 | Reynolds | |
| 2012/0225202 A1 | 9/2012 | Cheng | |
| 2013/0196109 A1 | 8/2013 | Moshe et al. | |
| 2013/0232673 A1* | 9/2013 | Johnson | A41D 31/02 2/455 |
| 2014/0178627 A1 | 6/2014 | Baychar | |

FOREIGN PATENT DOCUMENTS

| | | |
|---|---|---|
| CN | 103660422 | 3/2014 |
| CN | 103835145 | 6/2014 |
| DE | 4132427 | 4/1993 |
| EP | 1173327 | 6/2003 |
| GB | 2316341 | 2/1998 |
| TW | 1302958 | 11/2008 |
| WO | 98-29000 | 7/1998 |
| WO | 2006080907 | 8/2006 |
| WO | 2010114282 | 10/2010 |
| WO | 2010132083 | 11/2010 |

OTHER PUBLICATIONS

Evo, Website, Waterproof Ratings and Breathability Guide, Website, http://www.evo.com/waterproof-ratings-and-breathability-guide.aspx, 2015.

The North Face, Website, HYVENT® Tech : Waterproof, http://www.thenorthface.com/en_US/innovation/product-technology/hyvent/, 2015.

Mountain Equipment Co-operative, Website, Waterproof-Breathable Jacket, Copyright 2015, http://www.mec.ca/main/home.jsp.

Seattle Fabrics, Website, Camo Fleece-Super Waterproof/Breathable-Tex (2-Ply), http://www.seattlefabrics.com/outerwear, 2015.

* cited by examiner

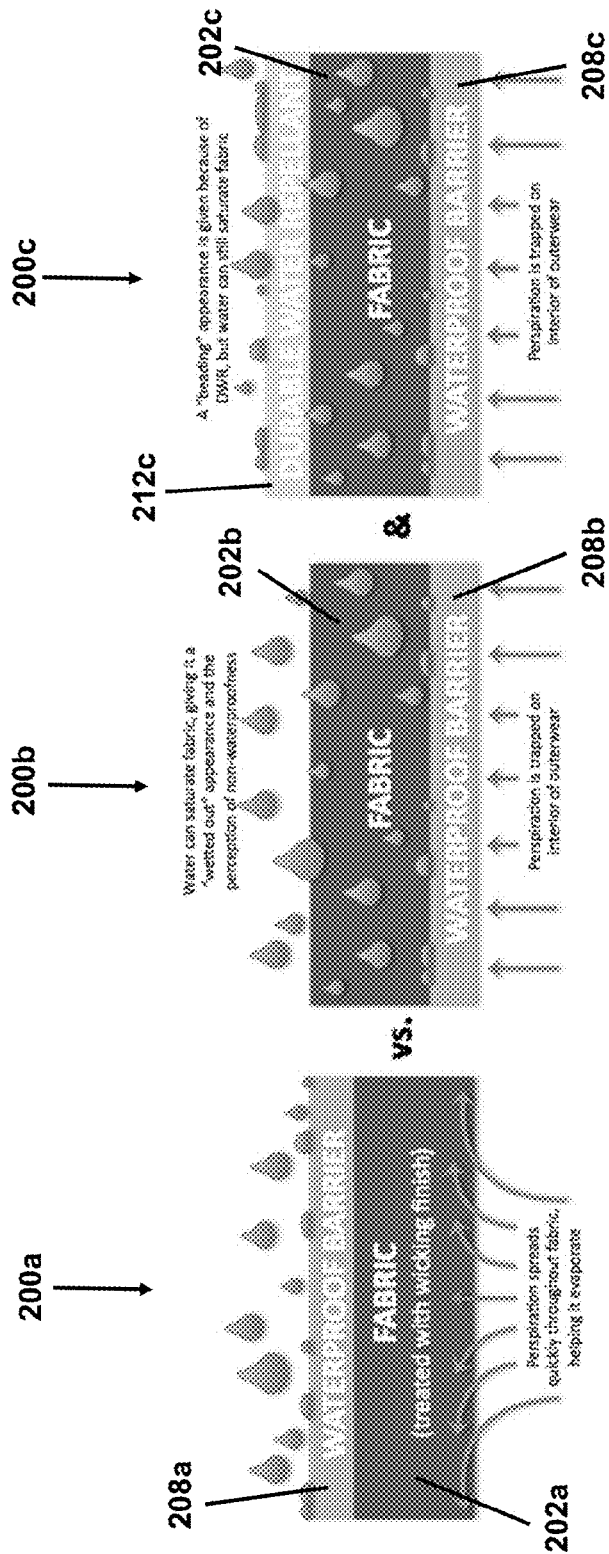

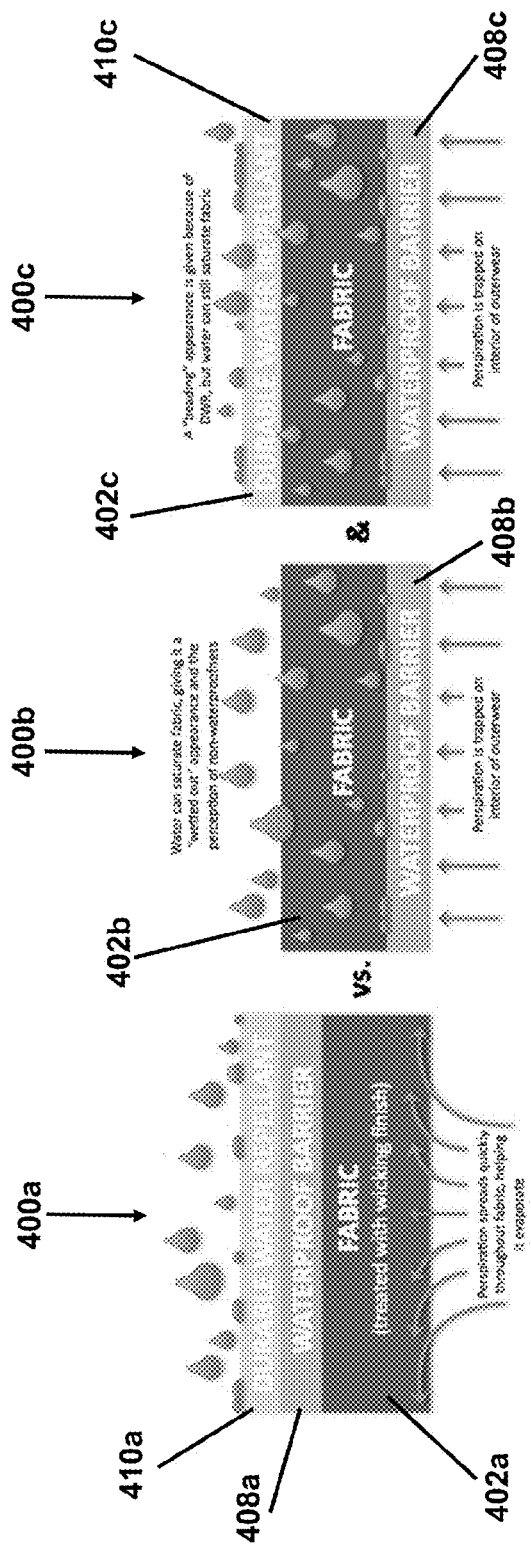

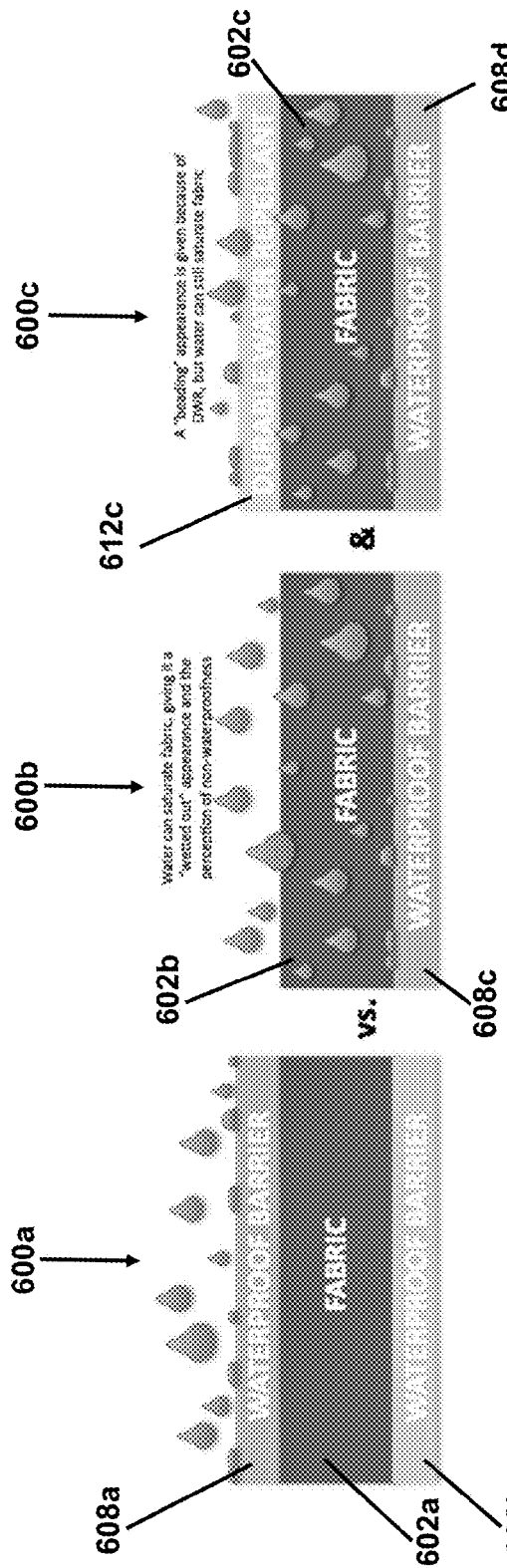

Figure 10

Testing Results

| | | |
|---|---|---|
| Fiber Analysis: Qualitative | For Blended fabrics ± 3 points of %, if fiber content ≦ 10% tolerance must be within ± 30% of stated content percentage | |
| Cuttable Width | ≧cuttable width specified | 57" |
| Weight | +/- 5% | 114g/m2 |
| Tensile | | Length | 161.3lbs |
| | | Width | 135.7lbs |
| Seam Slippage | Minimum 25 lbs | Length | 85.1lbs |
| | | Width | 120lbs |
| Tear Strength | | Length | 2.82lbs |
| | | Width | 4.22lbs |
| pH value | 4.0 to 6.5 for white, 4.0 to 7.5 for all others | |
| Dimensional Stability | | After 1 wash | (L) -2.8% |
| | | | (W)-3.2% |
| | | After 3 wash | (W)-3.2% |
| | | | (W)-3.2% |
| Home Laundering, ( visual assessment ) | After 5X wash, 3.0 for Face & 2.0 for Back | 4 |
| Martindale Pilling | 3 min. rating | 1.200/4 2.400/4 3.600/4 4.800/4 5.1000/4 |
| Martindale Abrasion | | 200 cycles pass; 400 cycles pass 600 cycles failed |
| Taber Abrasion | | |
| Brush Pill | 3 | |
| ICI Pill Box ( Snag test ) | ≦ 120g Micro denier fabrics - rating 4.0 | Length | 3 |
| | | Width | 3 |

Figure 10 (Cont.)

| Category Specific Required tests | | | |
|---|---|---|---|
| Rain Test | less than 1 gram | | 0.1 |
| Spray Rating - Random Test Required | As spec'd | Before Wash | 50 |
| | | After 5 Washes | 50 |
| Hydrostatic Pressure | As spec'd | Before Wash | (1)2277mm (2)2348mm (3)2784mm (4)2823mm (5)2438mm |
| | | After 5X Wash | (1)2754mm (2)2623mm (3)2754mm (4)3184mm (5)2677mm |
| Moisture Vapor Transmission | As spec'd | Before Wash | (1)6346g/m2/24hr(B1)-coating side as face<br><br>(2)4712g/m2/24hr(B1)-coating side as back |
| | | After 5X Wash | |
| Functionality/Performance tests | | | |
| Recovery | ≧85% within 1 min, | | |
| | ≧90% after 1 hr. | | |
| De-lamination | No delamination ( separation) | | |
| Mace Snag Test | 3.5 | Length | |
| | | Width | |
| Wrinkle Recovery | 3 | | |
| Wicking - Random Test Required | 3" | Before wash | (L) |
| | | | (W) |
| | | After 5X wash | (L) |
| | | | (W) |

Figure 10 (Cont.)

| Rate of Drying Time | ≥85% in ≤45 min | Before wash | |
| --- | --- | --- | --- |
| | | After 5x wash | |
| Air Permeability | As specified | | |
| Nano Finish - Random Test Required - AATCC 22 | 80/20 | | |
| Nano Finish - Random Test Required - AATCC 118 | 6 rating original, 4 after 20 washes | | |
| Nano Finish - Random Test Required - AATCC 193 Modified | 6 rating original, 4 after 20 washes | | |
| Antimicrobial - Random Test Required | Pass | | |
| Bonding | no separation | | |
| Flammability (non-exempt fabrics only) | Pass | | |
| Insulation Migration | 4 | | |
| Down proofness - Random Test Required | ≥4 | | Before Wash |
| | | After 1 Wash | |
| | | | |
| Flammability (tents) | Pass | | |
| Flammability (sleeping bags) | Pass | | |

FABRIC HAVING A WATERPROOF BARRIER

RELATED APPLICATIONS

The present application is a continuation-in-part of U.S. patent application Ser. No. 14/852,321, filed Sep. 11, 2015, entitled "Fabric Having a Waterproof Barrier," now U.S. Pat. No. 10,086,582, which claims priority to U.S. Provisional Patent Application No. 62/049,644, filed Sep. 12, 2014, entitled "Fabric Having a Waterproof Barrier," the entire disclosures of which are hereby incorporated by reference in their entirety. In addition, the present application claims priority to U.S. Provisional Patent Application No. 62/296,542, filed Feb. 17, 2017, entitled "Fabric Having a Waterproof Barrier," which is hereby incorporated by reference in its entirety.

TECHNICAL FIELD

Embodiments herein relate to apparel and sporting goods, and, more specifically, to fabrics having an ecologically friendly hydrophobic, waterproof barrier on an outward-facing surface of a base fabric.

BACKGROUND

Apparel including waterproof fabrics typically includes a base fabric and a hydrophilic, waterproof membrane coupled to the base fabric. The waterproof membrane prevents water from passing from the outward-facing surface of the base fabric to the body-facing surface of the base fabric, and this waterproof membrane typically is coupled to the body-facing surface of the fabric. The waterproof membrane can be uncomfortable for the user if it is in direct contact with the skin, and water (such as perspiration) can build up on the inside surface, making the fabric feel clammy and wet. This is generally addressed by adding a lining material that is the innermost layer of the apparel. Additionally, the outward-facing surface of the base fabric may absorb water, giving it a wetted-out appearance and increasing the weight of the base fabric. To address this concern, a durable water repellant coating or compound may be applied to the outward-facing surface of the base fabric to create a beading effect, but water may still eventually saturate the base fabric. In addition, traditional durable water repellant agents/compounds can cause negative environmental impacts.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIGS. 2A-2C illustrate three cross-sectional views of waterproof fabrics showing the mechanisms of action of the waterproof fabric illustrated in FIG. 1A (e.g., FIG. 2A) and two examples of conventional waterproof fabrics (FIGS. 2B and 2C), in accordance with various embodiments;

FIGS. 4A-4C illustrate three cross sectional views of waterproof fabrics showing the mechanisms of action of the waterproof fabric illustrated in FIG. 3A (e.g., FIG. 4A) and two examples of conventional waterproof fabrics (FIGS. 4B and 4C), in accordance with various embodiments;

FIGS. 6A-6C illustrate three cross sectional views of waterproof fabrics showing the mechanisms of action of the waterproof fabric illustrated in FIG. 5 (e.g., FIG. 6A) and two examples of conventional waterproof fabrics (FIGS. 6B and 6C), in accordance with various embodiments;

FIG. 10 illustrates the results of testing one embodiment of a waterproof fabric as described herein, in accordance with various embodiments.

DETAILED DESCRIPTION OF DISCLOSED EMBODIMENTS

Figure 1A:
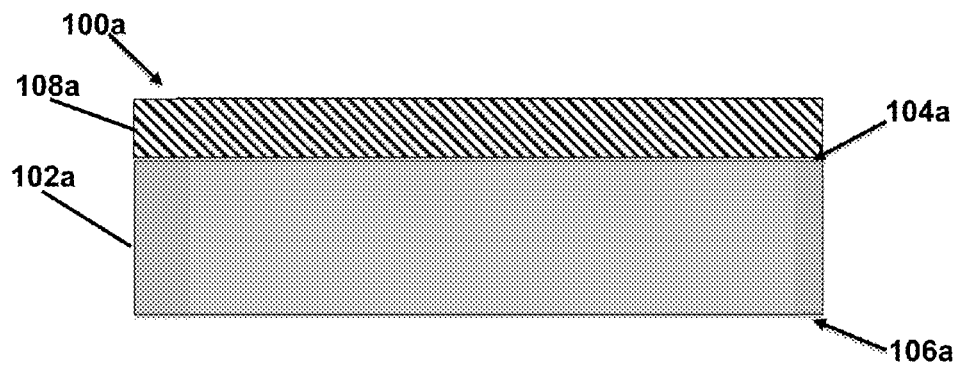
FIGS. 1A and 1B illustrate cross-sectional views of two examples of waterproof fabrics, one having a base fabric and a hydrophobic, waterproof barrier coupled to an outward-facing surface thereof (FIG. 1A), and one having a base fabric, a hydrophobic, waterproof barrier coupled to an outward-facing surface thereof, and an abrasion resistant coating or layer coupled to an outward-facing surface of the hydrophobic, waterproof barrier (FIG. 1B), in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Various embodiments provide waterproof fabrics that may prevent wetting-out or saturation of the outward-facing surface of the fabric, and that may also allow the wicking of moisture (e.g., perspiration and water vapor) from the body of a user in certain embodiments. Existing waterproof fabrics typically include a base fabric and a waterproof membrane, such as a hydrophilic, waterproof membrane, coupled to the base fabric. The hydrophilic, waterproof membrane prevents water from passing from the outward-facing surface of the base fabric to the body-facing surface of the base fabric, and this waterproof membrane typically is coupled to the body-facing surface of the fabric. In most examples, a hydrophilic membrane is selected so that it will absorb sweat, since the membrane faces the skin. Positioning the waterproof membrane on the body-facing surface of the base fabric prevents the waterproof membrane from being damaged (e.g., scuffed or abraded) during use, but it also creates problems.

For example, the waterproof membrane can be uncomfortable for the user if it is in direct contact with the skin, and water (such as perspiration) may build up on the body-facing surface of the membrane, giving the fabric an uncomfortable clammy feeling. A separate fabric liner positioned between the waterproof membrane and the user's body is sometimes used in conjunction with the waterproof fabric for this reason.

Additionally, because the outward-facing surface of the base fabric typically is exposed to the elements, it may absorb water (e.g., from rain and other precipitation), giving it a wetted-out appearance and increasing the weight of the base fabric. A durable water repellant (DWR), such as a C6 or C8 fluorocarbon, may be applied to the outward-facing surface of the base fabric to create a beading effect, but water may still eventually saturate the base fabric, as a DWR typically wears off gradually with use. This may create the impression that the waterproof fabric has failed, particularly when the saturation of the outward-facing surface is accompanied by moisture build-up on the body-facing surface. In various embodiments described herein, a base fabric may include a hydrophobic, waterproof barrier that is coupled to the outward-facing surface of the base fabric, rather than a body-facing surface. In embodiments, the waterproof barrier or membrane is breathable, preventing passage of water molecules by permitting air and moisture vapor to pass through the barrier/membrane. In some embodiments, the base fabric may have one or more functional properties, such as wicking or breathability, and/or may be treated with a wicking compound or other functional compound to enhance one or more functional properties of the base fabric.

For example, in some embodiments, the base fabric may be a wicking fabric. As used herein, the term "wicking fabric" refers to a fabric having a surface that becomes wet (e.g., and spreads the water across the fabric) when the contact angle of the water is less than 90 degrees. In some embodiments, the body-facing surface of the base fabric may be coated, dipped, or printed with a wicking compound, which compound may serve to enhance wicking and moisture dispersal throughout all or a portion of the base fabric. Specific, non-limiting examples of wicking compounds of use include copolymers of polyethylene glycol and polyethylene terephthalate, and dilute solutions of hydrophilic polyurethane.

In some embodiments, the wicking compound may be deposited in a continuous coverage pattern, whereas in other embodiments, the wicking compound may be applied in a continuous or non-continuous pattern. In particular embodiments, the base fabric may have other functional properties, such as heat direction, cooling, or insulation, and/or other functional compounds and/or elements may be applied to the body-facing surface of the base fabric, such as the heat-management materials disclosed in U.S. Pat. No. 8,453,270, the holographic heat management materials disclosed in U.S. Pat. No. 8,510,871, and/or the cooling elements of US Patent Application Publication No. 2013/0133353, all of which are hereby incorporated by reference for all purposes.

In various embodiments, the hydrophobic, waterproof barrier that is coupled to the outward-facing surface of the base fabric may be non-porous or microporous, and may include a plastic polymer, polyurethane, polyethylene, polyester, and/or polytetrafluoroethylene. In various embodiments, the hydrophobic, waterproof barrier may be coated on the outward-facing surface of the base fabric, which may be advantageous because using a coating rather than a laminating process may avoid the need for an additional adhesive layer, and it may ensure a strong bond between the hydrophobic, waterproof barrier and the base fabric, even when the base fabric has a textured surface. In other embodiments, the hydrophobic, waterproof barrier may be laminated, or printed on the outward-facing surface of the base fabric. In various embodiments, the hydrophobic, waterproof barrier may prevent environmental water or moisture (e.g., precipitation or the like) from reaching the outward-facing surface of the base fabric.

In some embodiments, an additional abrasion-resistant coating or layer, for example a polyurethane or polycarbonate layer, may be coated or over-printed on the outward-facing surface of the hydrophobic, waterproof barrier, for example to increase abrasion resistance of the waterproof barrier. In some embodiments, the abrasion-resistant coating or layer is a high molecular weight polyurethane or polycarbonate layer. As used herein, the term "high molecular weight polyurethane or polycarbonate layer" refers to a coating material having a high Young's modulus and a high solids composition, such as greater than 25%, for example 35-35%. In specific embodiments, the high molecular weight polyurethane or polycarbonate layer may be an ultra-high-molecular-weight polyethylene (UHMWPE), which term as used herein refers to a subset of the thermoplastic polyethylene, also known as high-modulus polyethylene (HMPE), or high-performance polyethylene (HPPE), that has extremely long chains, with a molecular mass usually between 2 and 6 million. In various embodiments, the longer chain may serve to transfer load more effectively to the polymer backbone by strengthening intermolecular interactions, resulting in a very tough material, with the highest impact strength of any thermoplastic presently made.

In other embodiments, the abrasion resistant layer may be a low molecular weight polyurethane or polycarbonate layer. For example, the polyurethane or polycarbonate layer may provide a durable surface that has a high hydrophobicity and that allows for moisture vapor transfer. In some embodiments, the abrasion-resistant coating or layer may be a discontinuous layer. For example, in some embodiments, the abrasion-resistant coating or layer may be applied in a discontinuous pattern, such as a lattice, stripes, or a repeating or random pattern of dots, squares, stars, circles, triangles, letters, words, logos, or other shapes. In some embodiments, the abrasion-resistant coating or layer may be used in a discontinuous pattern in order to maximize breathability of the base fabric, and in various embodiments, the abrasion-resistant coating or layer may cover about 15-50% of the surface area of the waterproof fabric. In particular embodiments, the abrasion-resistant coating or layer may contain a pigment and/or produce a color change when the fabric is exposed to moisture, and/or the abrasion-resistant coating or layer may enhance the texture of the outward-facing surface of the waterproof fabric.

Thus, in various embodiments, positioning the waterproof barrier on the outward-facing surface of the base fabric may allow the wicking base fabric to face the skin of the user, where it can wick perspiration from the skin. Additionally, positioning the waterproof barrier on the outside surface of the base fabric also may prevent the base fabric from absorbing precipitation or other moisture from the environment. In various embodiments, this combination of features may create a wicking, waterproof fabric that is both comfortable for the user and effective in maintaining waterproofness and preventing the base fabric from "wetting-out." In various embodiments, positioning the waterproof barrier on an outward-facing surface of the base fabric also enables the creation of waterproof, breathable, insulated materials, such as waterproof, breathable fleece fabrics, and waterproof, breathable down-insulated fabrics, which were nor possible prior to the present disclosure.

In some embodiments, the waterproof barrier and/or the abrasion-resistant coating or layer may be visible to a user, for example, and in some embodiments, the waterproof barrier and/or the abrasion-resistant coating or layer may produce a visible or textured pattern. In particular embodiments, the waterproof barrier and/or the abrasion-resistant coating or layer may contain one or more pigments or colorants, or may produce a color change when the fabric is exposed to moisture. In other embodiments, the waterproof barrier and/or the abrasion-resistant coating or layer may enhance the texture of the outward-facing surface of the waterproof fabric. In some embodiments, the waterproof barrier and/or the abrasion-resistant coating or layer may be disposed on a portion of a zipper coupled to the base fabric, and may enhance the performance and/or waterproofing of the zipper.

In some embodiments, the waterproof fabric may form a part of an article, such as an article of clothing or body gear, sporting gear, gloves, headwear, or footwear, and thus may contain one or more seams between two or more pieces of the disclosed waterproof fabrics. In various embodiments, positioning the hydrophobic, waterproof barrier on the outward-facing surface of the waterproof fabric may allow any seams in the fabric to be sealed (e.g., with waterproof tape coupled to/bonded to the hydrophobic, waterproof barrier) on the outward-facing surface of the waterproof fabric, rather than on the body-facing surface of the waterproof fabric. Sealing any seams in the waterproof fabric on the outside surface confers several advantages, compared to traditional, body-facing surface seam sealing. For example, when the base fabric is positioned on the outward-facing surface, water may infiltrate and eventually saturate the fabric (e.g., via "wetting out"), which may cause the fabric to swell or otherwise weaken the bond between the fabric and the waterproof barrier and/or waterproof tape from inside of the fabric. As the base fabric loads with water, the water may travel to the stitching located under the tape, for example, which may lead to deterioration of the waterproofness of the seam. Peeling of the seam tape may result in some embodiments and/or water ingress along the seam/stitching may result.

Additionally, conventional waterproof fabrics have exposed stitching, which may invite water ingress through the needle holes and allow absorption of water into the thread. By contrast, when the waterproof barrier is positioned on the outward-facing surface of the waterproof fabric, the waterproof tape or other seam sealant provides a barrier to water infiltration that may not be weakened by saturation of the base fabric. Furthermore, such exterior sealing prevents water ingress into the stitching and protects the stitching from abrasion (which could lead to a broken stitch in conventional waterproof fabric constructions).

In various embodiments, the bond between the waterproof tape and the hydrophobic, waterproof barrier may be formed directly, whereas in other embodiments, the waterproof tape may be applied over the abrasion-resistant coating or layer. In some embodiments, because the abrasion-resistant coating or layer may be discontinuous, applying the waterproof tape over the abrasion-resistant coating or layer may allow the waterproof tape to bond directly to the hydrophobic, waterproof barrier in the areas of discontinuity in the abrasion-resistant coating. In various embodiments, the waterproof tape may form a secure, waterproof bond with both the abrasion-resistant coating or layer and the hydrophobic, waterproof barrier.

In some embodiments, the waterproof fabric may further include a durable water repellant (DWR) agent applied to the outward-facing surface of the waterproof barrier and/or the outward-facing surface of the abrasion-resistant coating or layer (e.g., away from the user's skin.) In various embodiments, the DWR may be fluorocarbon-based, such as a C6 or C8 fluorocarbon and perfluorocarbons, also known as PFCs. In other embodiments, the DWR may be PFC-free.

In other embodiments, the DWR may be paraffin-based, polyurethane based, and silicon-based (inclusive of silicon and silicon dioxide based compounds including silicones). In some embodiments, such DWRs may have advantages over conventional fluorocarbon-based DWRs, since some fluorocarbons may cause environmental and/or health effects. These alternative DWRs are PFC-free, and therefore do not have these potential adverse effects on the environment and/or health. As such, an environmentally friendly DWR may be referred to as a PFC-free DWR, which for the purposes herein refers to a barrier/agent that is substantially free of fluorocarbon and perfluorocarbon, such as containing less than about 0.2 ppm PFCs. By substantially free of fluorocarbon and perfluorocarbon it is meant that the materials are free of fluorocarbon and perfluorocarbon contaminants present in the environment or cross-contamination that may occur within a manufacturing facility, for example having less than about 0.2 ppm, PFCs and/or less than 1 $\mu g/m^2$ PFCs for textiles and other applicable materials. With respect to the PFC-free materials described herein PFCs are not intentionally used in the manufacturing process.

In some embodiments, the DWR agent, including a PFC-free DWR, may be applied to (e.g., printed on, laminated to, and/or coated on) the waterproof barrier and/or the abrasion-resistant coating or layer to further enhance beading on the surface of the waterproof fabric. In some embodiments, rather than being applied to the outward-facing surface of the waterproof barrier and/or the abrasion-resistant coating or layer, the DWR may be dispersed in the waterproof barrier, for example as a fluorocarbon, paraffin, or silicon-based active ingredient dispersed in a polyurethane (PU), polypropylene, polypropylene, polyurethane, or polyethylene polyethylene or other such membrane. In some embodiments, the DWR agent may be applied to the hydrophobic, waterproof barrier, and the abrasion-resistant coating or layer may be applied over the DWR agent.

In typical articles using DWR, the DWR agent is applied directly to a textile to protect the textile from wetting out. In embodiments herein, a DWR agent is applied directly to a barrier/membrane. To address issues with bond strength between the DWR agent and the barrier, the DWR may comprise a quantity of the primary active component of the underlying barrier, such as PU. For example, a DWR agent including PU, along with an active ingredient, would likely have increased bond strength with an underlying PU barrier. Essentially, PU serves a cross-linker in the DWR agent formulation. In an example, there may be approximately 1-20% by weight cross-linker, such as PU, in the DWR agent formulation.

In addition to enhancing moisture beading, the additional DWR agent may also help protect the waterproof barrier from damage during use (e.g., increase the abrasion resistance). In some embodiments, the agent may be visible to a user. In embodiments, the DWR agent may be applied as a continuous layer or as a continuous or discontinuous pattern. However, to ensure protection of the underlying layer, it is generally preferred to apply to the DWR agent in a continuous layer.

In particular embodiments, hydrophobic, waterproof barrier may contain a pigment. In some embodiments, the DWR agent may produce a color change when the fabric is exposed to moisture. In embodiments, a mineral, such as titanium dioxide, may be added to the waterproof barrier to impart color or another property. Titanium dioxide, for example, provides a white color to the barrier, but also is purported to enhance brightness and opacity and enhance stain prevention. In embodiments, a DWR agent is provided with a greater % active ingredient (active water repellant chemical) than found in traditional DWR agents. In traditional formulations applied to a textile, the active ingredient (such as fluorocarbon) is applied in a solution containing about 6-10% by weight active ingredient. In embodiments herein, a DWR agent is provided having 15-25% by weight, such as 20%, active ingredient, such as a fluorocarbon or PFC-free DWR. Such a formulation may be further comprised of 15-25% by weight, such as 20%, isobutyl alcohol or isopropyl alcohol and 50-70%, such as 60%, water.

In embodiments, the DWR agent may enhance the texture of the outward-facing surface of the waterproof fabric.

While DWR is described above, in embodiments, a DWR agent may be eliminated. As noted above, many DWR agents have environmental concerns, and the additional treatment requires processing time and expense. In various embodiments, eliminating a DWR agent from the apparel may be enabled by the high hydrophobicity of the waterproof barrier, wherein the apparel still retains its waterproofness even without the DWR agent.

In addition to the features noted above to address the potential environmental concerns of apparel, footwear, and equipment manufacture, an environmentally friendly article may also include recycled materials such as fabrics, zippers, laces, straps, etc. In another embodiment, pigment may be fully or partially eliminated from the textile dyeing process thus eliminating (or greatly reducing) the amount of water consumed during the manufacture of the article. For example, in the production of an example jacket, eliminating a textile pigmenting or dyeing process may result in reduction of water usage by as much as 90% or more. Alternatively, to impart color, natural pigments may be used, which would have a reduced environmental impact. In certain embodiments, natural pigments may be used as a colorant for the hydrophobic, waterproof barrier. The use of natural pigments, such a charcoal, indigo, and bamboo, has the added benefit of being more environmentally friendly than pigments derived from petrochemical sources.

In certain embodiments, in addition to the DWR being PFC-free, one or more, such as all, of the additional material in the fabric are PFC-free. In certain embodiments, the hydrophobic, waterproof barrier disposed on the outward-facing surface of the base fabric is PFC-free, for example constructed from PFC-free materials such as paraffin-based, silicon-based (inclusive of silicon and silicon dioxide based compounds including silicones), polypropylene, polyurethane, or polyethylene materials. In certain embodiments, the base fabric is PFC-free, such as constructed from PFC-free materials as described herein. In certain embodiments, the waterproof tape bonded to an outward-facing surface of the hydrophobic, waterproof barrier is PFC-free, such as constructed from PFC-free materials as described herein. In certain embodiments, the abrasion-resistant coating disposed on the outward-facing surface of the hydrophobic, waterproof barrier is PFC-free, such as constructed from PFC-free materials as described herein.

In still other embodiments, the waterproof fabric may include a first hydrophobic, waterproof barrier on the outward-facing surface of the base fabric and a second hydrophobic, waterproof barrier on the body-facing surface of the base fabric. Although this embodiment does not have the advantage of positioning the wicking base fabric against the user's skin, it provides distinctions in manufacturing, wherein a seam may be sealed on an inside surface as is done with existing outerwear fabrics. Additionally, this embodiment allows a very thin and/or lightweight base fabric to be used, as it is sandwiched between two hydrophobic, waterproof barriers.

Figure 1B:
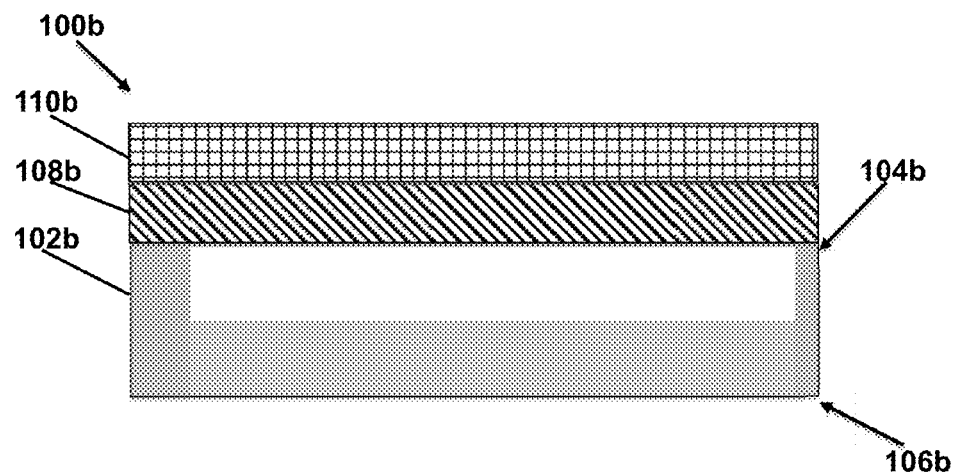

FIGS. 1A and 1B illustrate cross-sectional views of two examples of waterproof fabrics, one having a base fabric and a hydrophobic, waterproof barrier coupled to an outward-facing surface thereof (FIG. 1A), and one having a base fabric, a hydrophobic, waterproof barrier coupled to an outward-facing surface thereof, and an abrasion resistant coating or layer coupled to an outward-facing surface of the hydrophobic, waterproof barrier (FIG. 1B), in accordance with various embodiments. As shown in FIG. 1A, the waterproof fabric 100a includes a base fabric 102a that has an outward-facing surface 104a and a body-facing surface 106a. In various embodiments, the base fabric 102a may have wicking properties, or may be treated (e.g., coated, dipped, or printed) with a wicking compound. In various embodiments, positioning the base fabric 102a so that one surface faces the body may allow the base fabric to wick perspiration and/or other moisture away from the body, creating a dry sensation. In some embodiments, the base fabric 102a may have other functional properties, such as heat direction (e.g., heat conduction or reflectivity), cooling, or insulation. In some embodiments, the base fabric may be treated or coated with a wicking compound to enhance wicking.

In various embodiments, a waterproof barrier 108a may be coupled (e.g., coated, laminated, printed, etc.) on the outward-facing surface 104a of the base fabric 102a, creating a barrier to moisture penetration into the base fabric 102a. Positioning the waterproof barrier 108a on the outward-facing surface 104a prevents the base fabric 102a from "wetting-out," which could give a user the impression that the waterproofing ability of the fabric 100a has failed.

As shown in FIG. 1B, in another embodiment, the waterproof fabric 100b includes a base fabric 102b having an outward-facing surface 104b and a body-facing surface 106b, a waterproof barrier 108b coupled to the outward-facing surface 104b of the base fabric 102b, creating a barrier to moisture penetration into the base fabric 102b, and an abrasion-resistant coating or layer 110b coupled to the outward-facing surface of the waterproof barrier 108b. Although the abrasion-resistant coating or layer 110b is depicted as a continuous coating or layer, in some embodiments it may be applied in a discontinuous coating or layer, such that it covers about 15-50% of the surface area of the waterproof barrier. In various embodiments, the abrasion-resistant coating or layer 110b may be applied in a random or repeating pattern, and may be visually apparent to a user as a lattice or series of stripes, or a repeating pattern of dots, boxes, triangles, stars, letters, words, logos, or the like. In some embodiments, the abrasion-resistant coating or layer may be pigmented, or may produce a color change with in contact with water.

FIGS. 2A-2C illustrate three cross-sectional views of waterproof fabrics showing the mechanisms of action of the waterproof fabric illustrated in FIG. 1A (e.g., FIG. 2A) and two examples of conventional waterproof fabrics (FIGS. 2B and 2C), in accordance with various embodiments. In FIG. 2A, the waterproof barrier 208a prevents the waterproof fabric 200a from "wetting-out," while the base fabric 202a wicks perspiration from the skin of a user and allows it to spread throughout the fabric, thereby facilitating evaporation and minimizing the sensation of wetness.

By contrast, the conventional waterproof fabric 200b shown in FIG. 2B positions the waterproof barrier 208b on the body-facing surface of the base fabric 202b, thus preventing the base fabric 202b from absorbing perspiration, and trapping the perspiration on the interior surface of the waterproof fabric 200b. Additionally, because the outward-facing surface of the base fabric 202b has no waterproof barrier, water may saturate the base fabric 202b, giving it a "wetted-out" appearance and the perception of non-waterproofness.

Likewise, the conventional waterproof fabric 200c shown in FIG. 2C positions the waterproof barrier 208c on the body-facing surface of the base fabric 202c, thus preventing the base fabric 202c from absorbing perspiration, and trapping the perspiration on the interior surface of the waterproof fabric 200c. Additionally, although the waterproof fabric 200c includes a DWR agent 210c on the outward-facing surface of the base fabric 202c, water eventually may penetrate the DWR agent and saturate the base fabric 202c, giving it a "wetted-out" appearance and the perception of non-waterproofness.

Figure 3A:
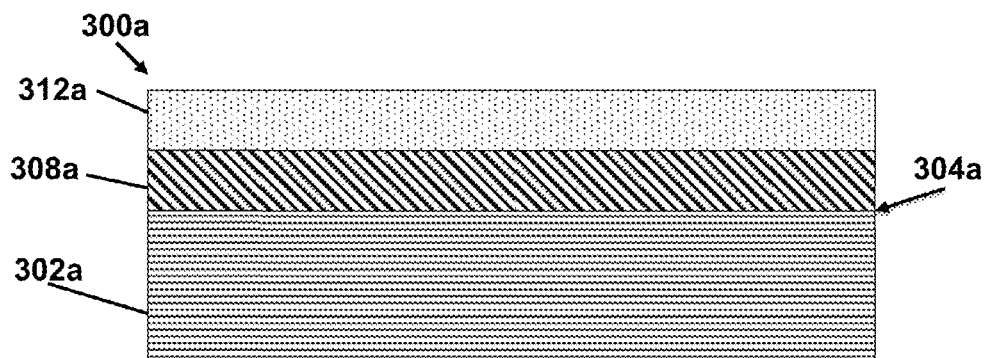
FIGS. 3A-3C illustrate cross-sectional views of three examples of a waterproof fabric, including an embodiment having a base fabric and a hydrophobic, waterproof barrier coupled to an outward-facing surface thereof, and a durable water repellant (DWR) coating on the outward-facing surface of the hydrophobic, waterproof barrier (FIG. 3A), an embodiment having a base fabric and a hydrophobic, waterproof barrier coupled to an outward-facing surface thereof, an abrasion-resistant coating or layer coupled to the outward-facing surface of the hydrophobic, waterproof barrier, and a DWR agent coupled to the abrasion-resistant coating or layer (FIG. 3B), and an embodiment having a base fabric and a hydrophobic, waterproof barrier coupled to an outward-facing surface thereof, a DWR agent on the outward-facing surface of the hydrophobic, waterproof barrier, and an abrasion-resistant coating or layer coupled to the DWR agent (FIG. 3C), in accordance with various embodiments.
Figure 3B:
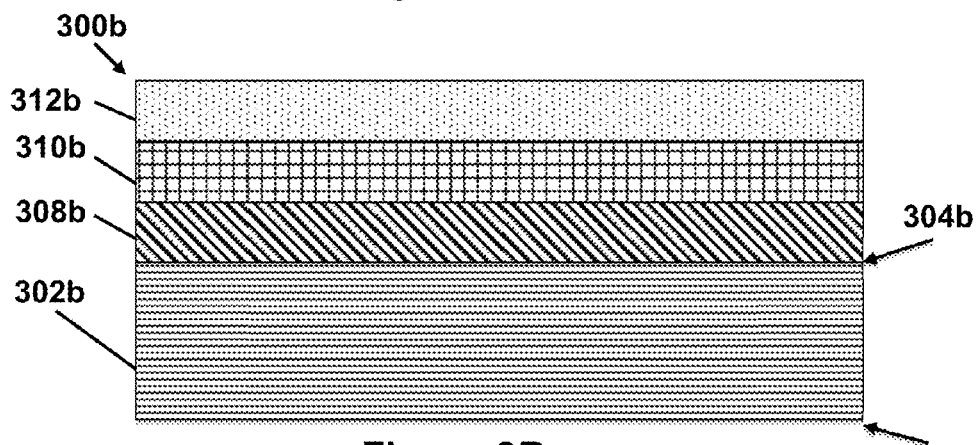
Figure 3C:
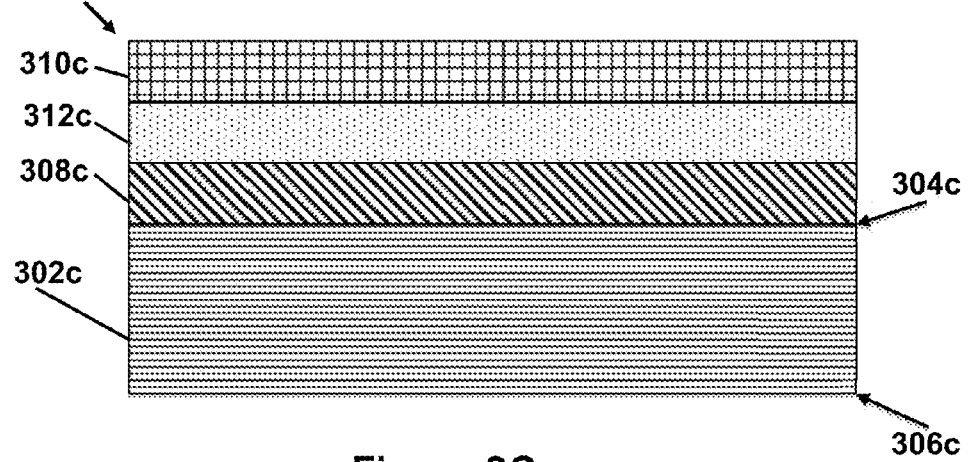

FIGS. 3A-3C illustrate cross-sectional views of three examples of a waterproof fabric, including an embodiment having a base fabric and a hydrophobic, waterproof barrier coupled to an outward-facing surface thereof, and a durable water repellant coating on the outward-facing surface of the hydrophobic, waterproof barrier (FIG. 3A), an embodiment having a base fabric and a hydrophobic, waterproof barrier coupled to an outward-facing surface thereof, an abrasion-resistant coating or layer coupled to the outward-facing surface of the hydrophobic, waterproof barrier, and durable water repellant coating coupled to the abrasion-resistant coating or layer (FIG. 3B), and an embodiment having a base fabric and a hydrophobic, waterproof barrier coupled to an outward-facing surface thereof, a durable water repellant coating on the outward-facing surface of the hydrophobic, waterproof barrier, and an abrasion-resistant coating or layer coupled to the durable water repellant coating (FIG. 3C), in accordance with various embodiments.

Like the waterproof fabric 100a illustrated in FIG. 1A, the waterproof fabric 300a illustrated in FIG. 3A includes a base fabric 302a that has an outward-facing surface 304a and a body-facing surface 306a. In various embodiments, the base fabric 302a may have wicking properties, or may be treated (e.g., coated, dipped, or printed) with a wicking compound. In various embodiments, a hydrophobic, waterproof barrier 308a may be coupled (e.g., coated, laminated, printed, etc.)

on the outward-facing surface 304a of the base fabric 302a, creating a barrier to moisture penetration into the outward-facing surface 304a of the base fabric 302a. As described above, positioning the waterproof barrier 308a on the outward-facing surface 304a prevents the base fabric 302a from "wetting-out," which could give a user the impression that the waterproofing ability of the fabric 300a has failed. Additionally, a DWR agent 312a (e.g., which may be a PFC-free DWR and/or applied in a discontinuous pattern, in some embodiments), may be applied to (e.g., deposited on, printed on, laminated to, and/or coated on) the outward-facing surface of the waterproof barrier 308a, thereby enhancing water beading and/or abrasion resistance on the outer surface of the waterproof fabric 300a.

In the embodiment depicted in FIG. 3B, the waterproof fabric 300b includes a base fabric 302b that has an outward-facing surface 304b and a body-facing surface 306b, a hydrophobic, waterproof barrier 308b coupled to the outward-facing surface 304b of the base fabric 302b, and an abrasion-resistant coating or layer 310b coupled to the hydrophibic, waterproof barrier 308b. Additionally, a DWR agent 312b (such as a PFC-free DWR) is applied to the outward-facing surface of the abrasion-resistant coating or layer 310b, thereby enhancing water beading on the outer surface of the waterproof fabric 300b.

In the embodiment depicted in FIG. 3C, the waterproof fabric 300c includes a base fabric 302c that has an outward-facing surface 304c and a body-facing surface 306c, a hydrophobic, waterproof barrier 308c coupled to the outward-facing surface 304c of the base fabric 302c, and a DWR agent 312c (such as a PFC-free DWR) coupled to the hydrophobic, waterproof barrier 308c. Additionally, an abrasion-resistant coating or layer 310c is applied to the outward-facing surface of the DWR agent 312c, thereby enhancing abrasion resistance on the outer surface of the waterproof fabric 300b.

FIGS. 4A-4C illustrate three cross sectional views of waterproof fabrics showing the mechanisms of action of the waterproof fabric illustrated in FIG. 3A (e.g., FIG. 4A) and two examples of conventional waterproof fabrics (FIGS. 4B and 4C), in accordance with various embodiments. As shown in FIG. 4A, the waterproof barrier 408a and the DWR agent 410a may work together to prevent the waterproof fabric 400a from "wetting-out," while the base fabric 402a wicks perspiration from the skin of a user.

By contrast, the conventional waterproof fabric 400b shown in FIG. 4B positions the waterproof barrier 408b on the body-facing surface of the base fabric 402b, thus preventing the base fabric 402b from absorbing perspiration, and trapping the perspiration on the interior surface of the waterproof fabric 400b. Additionally, because the outward-facing surface of the base fabric 402b has no waterproof barrier, water may saturate the base fabric 402b, giving it a "wetted-out" appearance and the perception of non-waterproofness.

Likewise, the conventional waterproof fabric 400c shown in FIG. 4C positions the waterproof barrier 408c on the body-facing surface of the base fabric 402c. Although the waterproof fabric 400c includes a DWR agent 410c on the outward-facing surface of the base fabric 402c, water eventually may penetrate the DWR agent (or the DWR agent may wear off), and water may saturate the base fabric 402c, giving it a "wetted-out" appearance and the perception of non-waterproofness.

Figure 5:
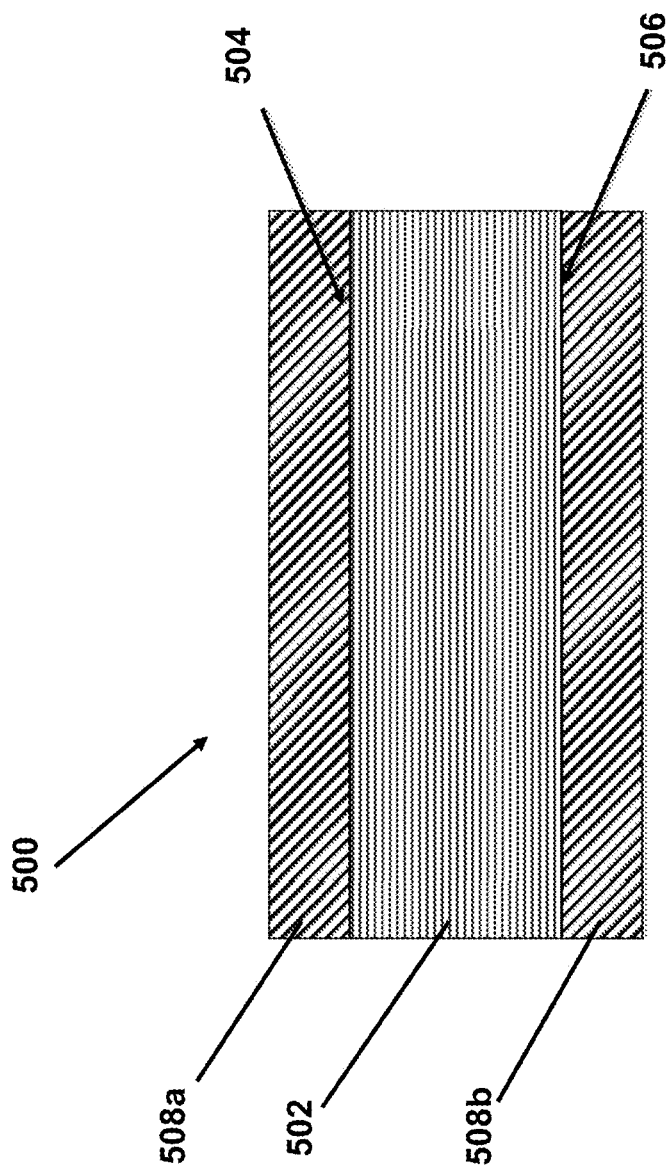
FIG. 5 illustrates a cross-sectional view of an example of a waterproof fabric having a base fabric and a first hydrophobic, waterproof barrier coupled to an outward-facing surface thereof, and a second hydrophobic, waterproof barrier coupled to a body-facing surface of the base fabric, in accordance with various embodiments.

FIG. 5 illustrates a cross-sectional view of another example of a waterproof fabric, in accordance with various embodiments. In this embodiment, in addition to the hydrophobic, waterproof barrier 508a on the outward-facing surface 504 of the base fabric 502, waterproof fabric 500 also includes a second hydrophobic, waterproof barrier 508b on the body-facing surface 506 of the base fabric 502. Although this embodiment does not have the advantage of positioning the wicking base fabric 502 against the user's skin, it provides advantages in manufacturing, wherein a seam may be sealed on an inside surface as is done with existing outerwear fabrics. Additionally, a very thin and/or light-weight base fabric 502 may be used, as it is sandwiched between two hydrophobic, waterproof barriers 508a, 508b.

FIGS. 6A-6D illustrate three cross sectional views of waterproof fabrics showing the mechanisms of action of the waterproof fabric illustrated in FIG. 5 (FIG. 6A) and two examples of conventional waterproof fabrics (FIGS. 6B and 6C), in accordance with various embodiments. As shown in FIG. 6A, the first waterproof barrier 608a prevents the waterproof fabric 600a from "wetting-out," The second waterproof barrier 608b is positioned on the body-facing surface of the base fabric 602a, and allows an article made from the waterproof fabric 600a to use conventional seam-sealing technologies.

By contrast, the conventional waterproof fabric 600b shown in FIG. 6B positions the waterproof barrier 608c on the body-facing surface of the base fabric 602b. Thus, because the outward-facing surface of the base fabric 602b has no waterproof barrier, water may saturate the base fabric 602b, giving it a "wetted-out" appearance and the perception of non-waterproofness.

Likewise, the conventional waterproof fabric 600c shown in FIG. 6C positions the waterproof barrier 608d on the body-facing surface of the base fabric 602c. Although the waterproof fabric 600c includes a DWR agent 612c on the outward-facing surface of the base fabric 602c, water eventually may penetrate the DWR agent and saturate the base fabric 602c, giving it a "wetted-out" appearance and the perception of non-waterproofness.

Figure 7A:
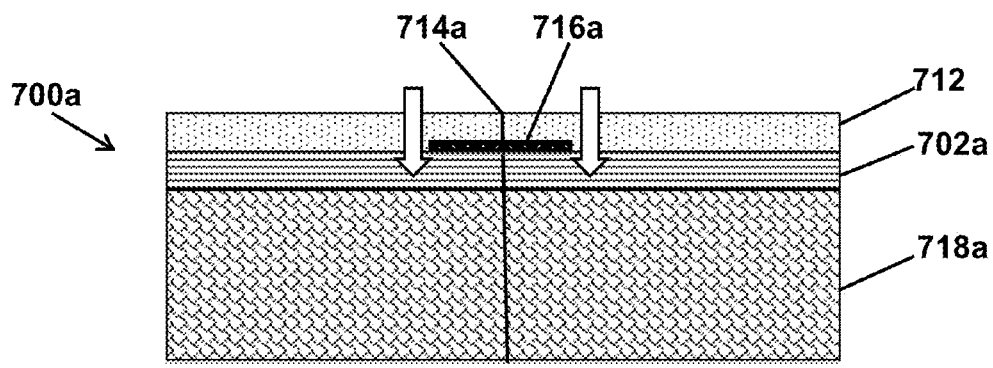
FIGS. 7A-7C illustrate three examples of waterproof soft shell or fleece fabrics having a waterproofed seam, including an embodiment having a base fabric, a fleece or soft shell fabric, and a DWR agent, wherein the seam is sealed with waterproof tape applied to the outward-facing surface of the base fabric (FIG. 7A), an embodiment having a base fabric with a waterproof barrier coupled to a body-facing surface, wherein the seam is waterproofed by skiving the fleece or soft shell layer and applying a waterproof tape to the body-facing surface of the waterproof barrier (FIG. 7B), and an embodiment wherein a waterproof barrier is coupled directly to an outward-facing surface of the fleece or soft shell layer and the seam is sealed by bonding waterproof tape to the outward-facing surface of the waterproof membrane (FIG. 7C), in accordance with various embodiments.
Figure 7B:
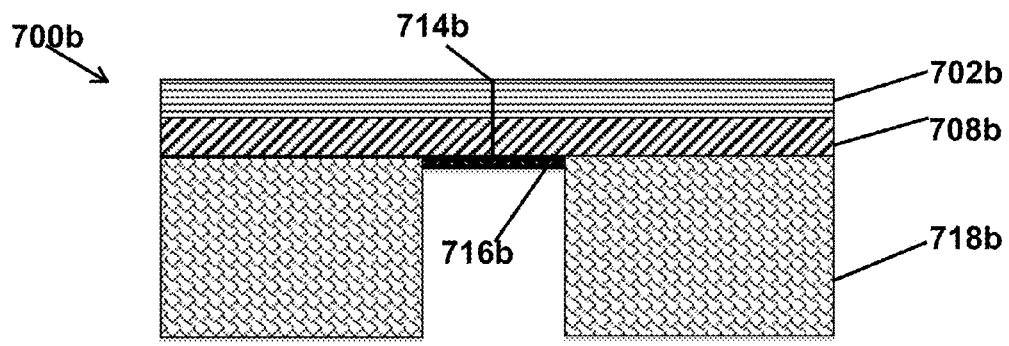
Figure 7C:
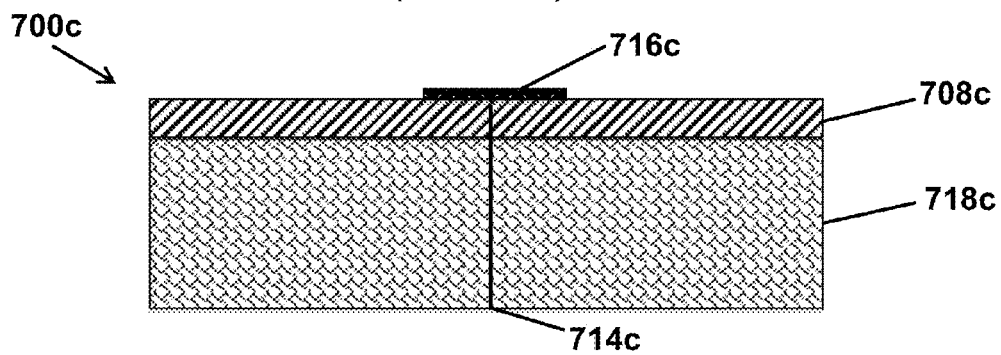

In various embodiments, an advantage of the various waterproof fabrics disclosed herein is that a seam in the fabric layers, such as may exist between a sleeve and a body of a garment, may be waterproofed by bonding a waterproof tape directly to the outward-facing surface of the hydrophobic, waterproof barrier. FIGS. 7A-7C illustrate three examples of waterproof soft shell or fleece fabrics having a waterproofed seam, including an embodiment having a base fabric, a fleece or soft shell fabric, and a DWR agent, wherein the seam is sealed with waterproof tape applied to the outward-facing surface of the base fabric (FIG. 7A), an embodiment having a base fabric with a waterproof barrier coupled to a body-facing surface, and wherein the seam is waterproofed by skiving the fleece or soft shell layer and applying a waterproof tape to the body-facing surface of the waterproof barrier (FIG. 7B), and an embodiment wherein a waterproof barrier is coupled directly to an outward-facing surface of the fleece or soft shell layer and the seam is sealed by bonding waterproof tape to the outward-facing surface of the waterproof membrane (FIG. 7C), in accordance with various embodiments. In the example illustrated in FIG. 7A, a base material 702a is bonded to a fleece or soft shell fabric 718a, and a DWR agent 712 is applied to an outward-facing surface of the base fabric 702a. A seam 714a, which might be positioned at any of a number of positions in an article of clothing, body gear, footwear, or sporting goods runs through the full thickness of the material 700a, and is sealed on the outward-facing surface of the base material 702a with waterproof tape 716a bonded to the base fabric 702a.

In the illustrated example, water (indicated by arrows) may eventually infiltrate the base fabric 702a through the DWR agent 712, and may cause the bond between the waterproof tape 716a and the base fabric 702a to deteriorate. In some embodiments, this may eventually lead to water ingress at the seam 714a and/or peeling of the waterproof tape 716a and failure of the waterproofing of the seam 714a.

In the example illustrated in FIG. 7B, a body-facing surface of a base material 702b is bonded to a waterproof barrier 708b, which in turn is bonded to a fleece or soft shell fabric 718b. A seam 714b runs through the full thickness of the material 700b, and is sealed on the body-facing surface of the waterproof barrier 708b with waterproof tape 716b. In order to access the body-facing surface of the waterproof barrier 708b, the fleece or soft shell fabric 718b is skived (e.g., cut away) to reveal the waterproof barrier 708b before the waterproof tape 716b is applied. This requires an extra step in the manufacturing process, and also leaves areas of the article of clothing, body gear, footwear, or sporting equipment lacking the insulation of the fleece or soft shell fabric 718b. Additionally, the waterproof material 700b suffers from the same shortcomings of the fabrics illustrated in FIGS. 2B and 4B, namely wetting out of the base fabric 702b.

By contrast, the waterproof, insulated material illustrated in FIG. 7C avoids these problems. In the example illustrated in FIG. 7C, a waterproof barrier 708c, is bonded to a fleece or soft shell fabric 718c. A seam 714c runs through the full thickness of the waterproof, insulated material 700c, and is sealed on the outward-facing surface of the waterproof barrier 708c with waterproof tape 716c. This prevents the issues related to wetting out of the base fabric illustrated in FIG. 7C, and also permits a strong bond to be formed between the waterproof barrier 708c and the waterproof tape 716c, which ensures that the seam 714c does not deteriorate and fail.

Figure 8A:
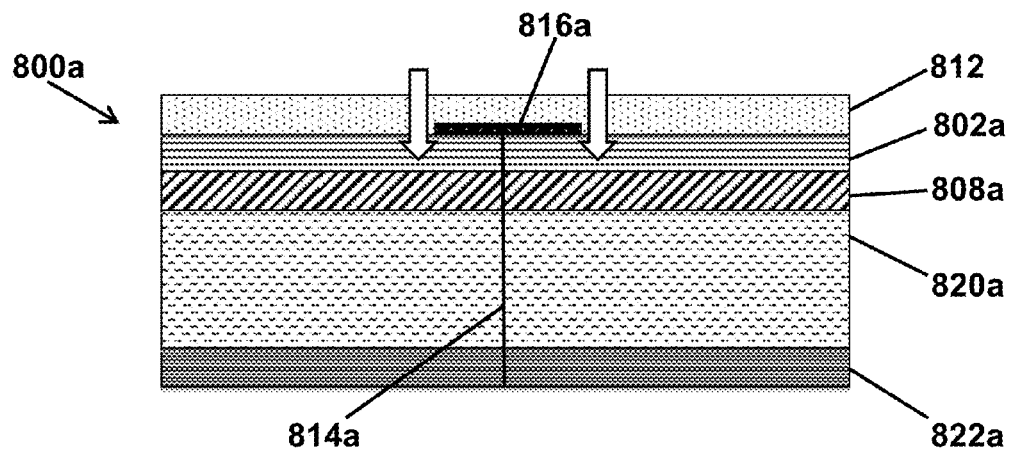
FIGS. 8A and 8B illustrate two examples of waterproof insulated materials, including an embodiment having an insulating layer bounded by an outer base fabric and an inner lining fabric, a waterproof barrier bonded to a body facing surface of the outer base fabric, a DWR coating or layer, and a seam that is waterproofed with a waterproof tape bonded to the outward-facing surface of the outer base fabric (FIG. 8A), and an embodiment having an insulating layer bounded by an outer base fabric and an inner lining fabric, a waterproof barrier bonded to an outward-facing surface of the outer base fabric, and a seam that is waterproofed with a waterproof tape bonded to the outward-facing surface of the waterproof barrier (FIG. 8B), in accordance with various embodiments.
Figure 8B:
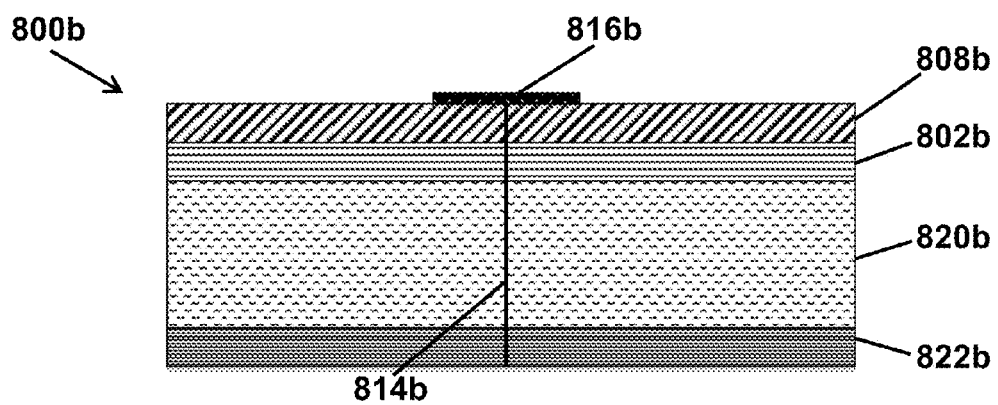

FIGS. 8A and 8B illustrate two examples of waterproof insulated materials, including an embodiment having an insulated layer bounded by an outer base fabric and an inner lining fabric, a waterproof barrier bonded to a body facing surface of the outer base fabric, a DWR coating or layer, and a seam that is waterproofed with a waterproof tape bonded to the outward-facing surface of the outer base fabric (FIG. 8A), and an embodiment having an insulated layer bounded by an outer base fabric and an inner lining fabric, a waterproof barrier bonded to an outward-facing surface of the outer base fabric, and a seam that is waterproofed with a waterproof tape bonded to the outward-facing surface of the waterproof barrier (FIG. 8B), in accordance with various embodiments. In the example illustrated in FIG. 8A, an insulating layer 820a, which may include natural insulation, synthetic insulation, or a combination of both, is bounded on an outward-facing surface by an outer base fabric 802a, and on a body-facing surface by a lining fabric 822a. The body-facing surface of the base fabric 802a is bonded to a waterproof barrier 808a, and the outward-facing surface of the base fabric 802a may be coated with a DWR agent (such as a PFC-free DWR). A seam 814a runs through the full thickness of the material 800a, and is sealed on the outward-facing surface of the base fabric 802a with a waterproof tape 816a.

In the illustrated example, water (indicated by arrows) may eventually infiltrate the base fabric 802a through the DWR agent 812 (such as a PFC-free DWR), and may cause the bond between the waterproof tape 816a and the base fabric 802a to deteriorate. In some embodiments, this may eventually lead to peeling of the waterproof tape 816a and failure of the waterproofing of the seam 814a.

By contrast, the waterproof, insulated material illustrated in FIG. 8B avoids these problems. In the example illustrated in FIG. 8B, an insulating layer 820b, which may include natural insulation, synthetic insulation, or a combination of both, is bounded on an outward-facing surface by an outer base fabric 802b, and on a body-facing surface by a lining fabric 822b. In some embodiments, a specific configuration of synthetic and natural insulating material may be used as disclosed in U.S. application Ser. No. 14/286,869, which is hereby incorporated by reference in its entirety.

The outward-facing surface of the base fabric 802b is bonded to a waterproof barrier 808b. A seam 814b runs through the full thickness of the insulated material 800b, and is sealed by forming a bond between waterproof tape 816b and the outward-facing surface of the waterproof barrier 808b. This construction prevents the base fabric 802b from wetting out, and also permits a strong bond to be formed between the waterproof barrier 808b and the waterproof tape 816b, which ensures that the seam 814b does not deteriorate and fail.

EXAMPLES

Example 1

Testing of Water Vapor Transmission Rate Through Waterproof Fabrics

Water vapor transmission testing is often conducted with an apparatus in which a fabric sample is sealed on top of a cup containing water, and the weight of the cup is monitored gravimetrically as a function of time. Environmental temperature, relative humidity and air flow rate across the sample are noted. Typically, the cup and the environment are the same temperature. In the present Example, custom-made heated cup holders were constructed by wrapping an aluminum-foil-lined flexible heater around the base of a cup. Cups were obtained from Thwing-Albert Instrument Company, and were the EZ-Cup Vapometer Permeability Cup, depth 2" (Part No. 68-3000). Heaters were obtained from McMaster-Carr, and the Super-Flexible Ultra-Thin Heat Sheet, 2"×10" (Part No. 8009T12) was used to heat the cups. Cup temperature was monitored by a K-type thermocouple placed on the inner surface of the heated cup holder at the water level. Fully assembled cups with water and fabric were equilibrated at the elevated cup temperature in an environmental chamber (Lunaire Tenney BTRC) for 30 minutes prior to data collection. Data were collected from the pre-heated cup as mass versus time. The slope of mass-versus-time plot is normalized by the fabric area to give the water vapor transmission rate (WVTR.) Cups were held in an upright configuration during testing. Each cup contained 80 mL deionized H20 (~1" filled) at the start of each test, which lasted 2.5 hours, with measurements taken every 30 minutes. The cup temperature on outside surface was kept at 35.0° C., the water temperature after equilibration was 34.6-34.9° C., the environmental temperature was 24.8±0.4° C., the environmental relative humidity was 51.0±4.7%, and air flow was measured for a 90 second interval and found to vary between 0 and 59 FPM. All samples were subjected to the same testing conditions.

Figure 9A:
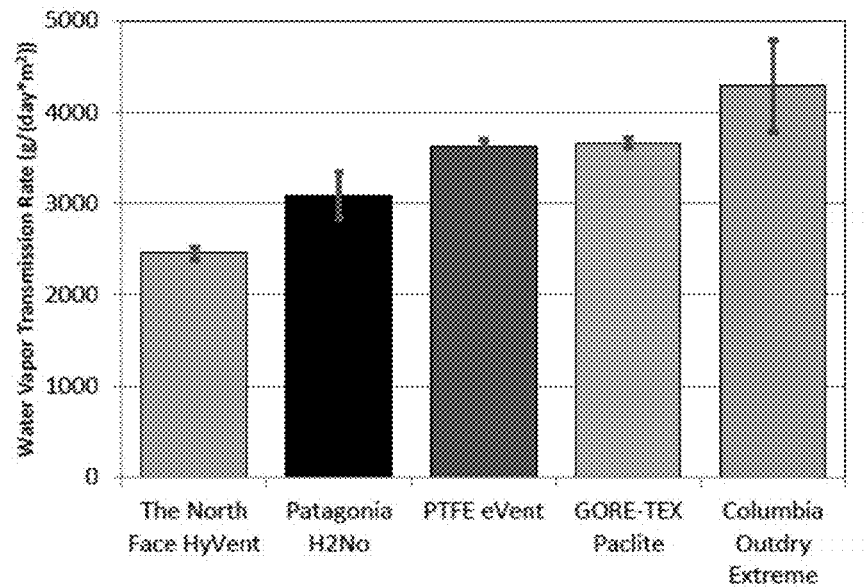
FIGS. 9A-9C are graphs illustrating the water vapor transmission rate of various commercially available waterproof fabrics as compared to an embodiment of the waterproof fabrics disclosed herein (FIG. 9A), the percentage to which the waterproof fabric of FIG. 9A transmits water vapor compared to commercially available fabrics (FIG. 9B), and the data shown in FIGS. 9A and 9B presented in combined form (FIG. 9C), in accordance with various embodiments.
Figure 9B:
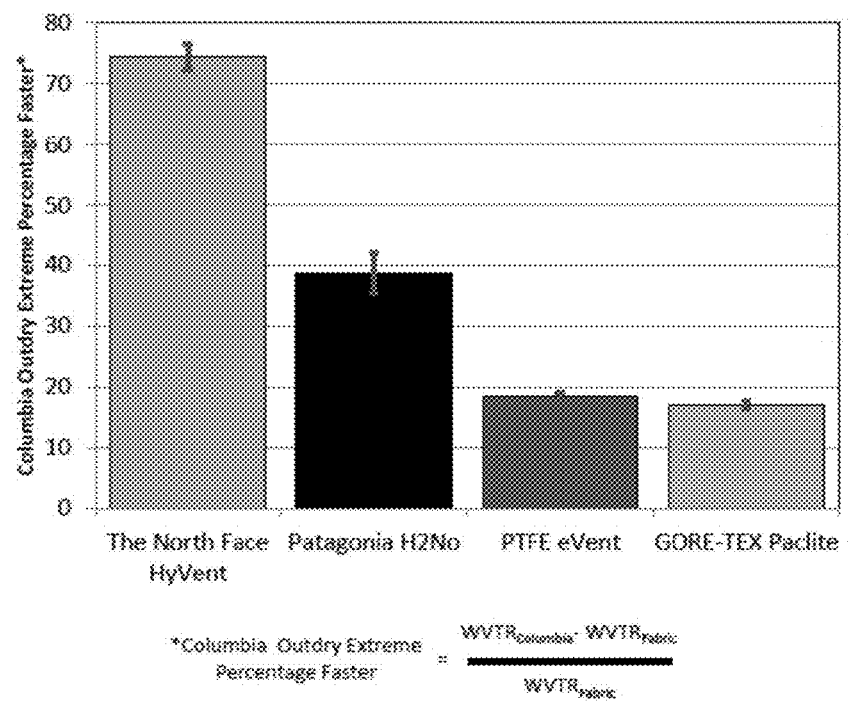
Figure 9C:
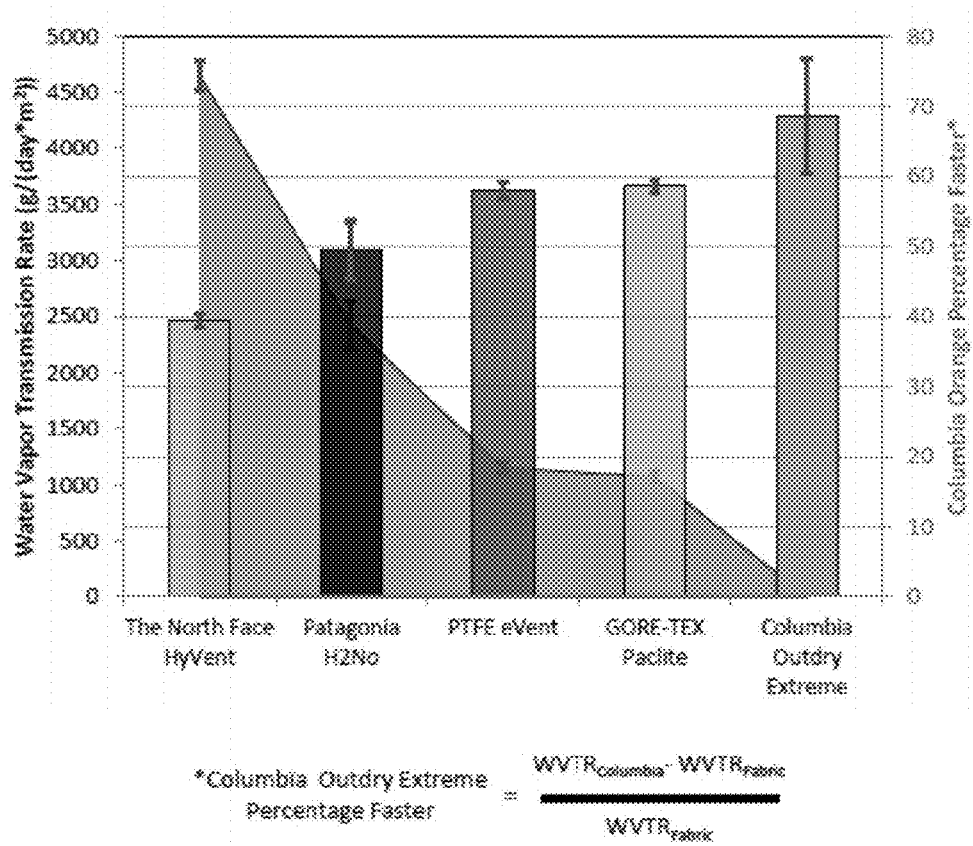

FIGS. 9A-9C are graphs illustrating the water vapor transmission rate of various commercially available waterproof fabrics as compared to an embodiment of the waterproof fabrics disclosed herein (FIG. 9A), the percentage to which the waterproof fabric of FIG. 9A transmits water vapor compared to commercially available fabrics (FIG. 9B), and the data shown in FIGS. 9A and 9B presented in combined form (FIG. 9C), in accordance with various embodiments. FIG. 9A illustrates the measured values of MVTR with 2-3 measurements taked from each fabric sample. The fabric disclosed in the present application (e.g., Columbia Outdry Extreme™) was determined to have the fasted WVTR when compared to other commercially available fabrics. FIG. 9B shows the percentage faster by which the Columbia Outdry Extreme™ fabric transmitted water vapor as compared to the control fabrics, with the percentage calculated as ((WVTR Test Fabric)-(WVTR Control Fabric))/(WVTR Control Fabric). The Test fabric (e.g., Columbia Outdry Extreme™) was found to transmit water vapor 17-74% faster compared to the control fabrics.

Example 2

Testing of Physical Properties of Waterproof Fabric

FIG. 10 illustrates the results of testing one embodiment of a waterproof fabric as described herein. As shown in FIG. 10, the waterproof fabric showed a 35% improvement on the JIS L1099 B1 MVTR test when compared to a conventional waterproof fabric (see, e.g., "moisture vapor transmission" and compare condition 1, which is the test fabric ("coating side as face," which showed a moisture vapor transmission rate (MVTR) of 6,346 g/m$^2$/24 hr) to condition 2, which is the control fabric ("coating side as back," which showed a MVTR of 4,712 g/m$^2$/24 hr)). Furthermore, the waterproof fabric examined in this test did not include a wicking finish applied to the base fabric, and therefore one of skill in the art would expect a waterproof fabric having such a wicking finish to show an even larger improvement.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An article of clothing, body gear, sporting gear, gloves, headwear, or footwear, comprising:
   a base material having an inward-facing surface and an outward-facing surface;
   an exposed, breathable, hydrophobic, waterproof barrier disposed on the outward-facing surface of the base material, the waterproof barrier having an exposed, outward-facing surface and an inward-facing surface directed toward the base material;
   a seam running through the waterproof barrier; and
   a waterproof tape bonded to the outward-facing surface of the waterproof barrier and oriented to seal the seam against water ingress.

2. The waterproof material of claim 1, further comprising a perfluorocarbon-free (PFC-free) durable water repellant (DWR) agent disposed on the outward-facing surface of the waterproof barrier.

3. The waterproof material of claim 2, wherein the PFC-free DWR agent comprises paraffin or a silicon-based active ingredient.

4. The waterproof material of claim 2, wherein the PFC-free DWR agent comprises 15-25% by weight active water repellant ingredient.

5. The waterproof material of claim 1, further comprising an abrasion-resistant coating disposed on the outward-facing surface of the waterproof barrier.

6. The waterproof material of claim 5, wherein the waterproof tape is applied over the abrasion-resistant coating, and wherein the waterproof tape bonds to both the abrasion-resistant coating and the waterproof barrier.

7. The waterproof material of claim 5, wherein the abrasion-resistant coating covers about 15-50% of a surface area of the waterproof material.

8. The waterproof material of claim 1, wherein the waterproof barrier comprises titanium dioxide.

9. The waterproof material of claim 1, wherein the waterproof barrier comprises polyurethane.

10. The waterproof material of claim 9, wherein the waterproof barrier comprises 1-20% by weight polyurethane.

11. The waterproof material of claim 1, wherein the waterproof barrier is perfluorocarbon-free (PFC free).

12. The waterproof material of claim 1, wherein the waterproof barrier is pigmented.

13. The waterproof material of claim 12, wherein the pigment comprises one or more natural pigments.

14. The waterproof material of claim 1, wherein the waterproof barrier comprises one or more of charcoal, indigo, and bamboo pigments to impart color.

15. The waterproof material of claim 1, wherein the waterproof material is undyed.

16. The waterproof material of claim 1, wherein the base material is perfluorocarbon-free (PFC-free).

17. A method of making a waterproof article of clothing, body gear, sporting gear, gloves, headwear, or footwear, the method comprising:
   providing a base material having an inward-facing surface and an outward-facing surface;
   disposing an exposed, breathable, hydrophobic, waterproof barrier on the outward-facing surface of the base material, thereby forming a waterproof material, wherein the waterproof barrier has an exposed outward-facing surface and an inward-facing surface directed toward the base material; and
   forming the article with the waterproof material, wherein forming the article comprises creating a seam between two pieces of the waterproof barrier; and bonding a waterproof tape to the outward-facing surface of the waterproof barrier, wherein bonding the waterproof tape comprises aligning the waterproof tape to seal the seam against water ingress.

18. The method of claim 17, further comprising:
   disposing a perfluorocarbon-free (PFC-free) durable water repellant (DWR) agent on the outward-facing surface of the waterproof barrier.

19. The method of claim 18, wherein the PFC-free DWR agent comprises 15-25% by weight isobutyl alcohol or isopropyl alcohol.

20. The method of claim 18, wherein the PFC-free DWR agent comprises 50-70% by weight water.

* * * * *